United States Patent [19]

Gau et al.

[11] Patent Number: 5,739,915
[45] Date of Patent: Apr. 14, 1998

[54] ELECTRO-OPTICAL SYSTEM FOR SCANNING COLOR DOCUMENTS

[75] Inventors: Jen-Jr Gau, Taipei; Hsiu-Hua Chuang, Hsinchu, both of Taiwan

[73] Assignee: United Microelectronics Corp., Hsinchu, Taiwan

[21] Appl. No.: 646,752

[22] Filed: May 8, 1996

[51] Int. Cl.$^6$ ............................................. G01J 3/51
[52] U.S. Cl. .................. 356/406; 356/407; 356/419; 250/226
[58] Field of Search .......................... 356/406, 407, 356/416, 419; 250/226; 359/298

[56] References Cited

FOREIGN PATENT DOCUMENTS 63-191033  8/1988  Japan ..................... 356/416

*Primary Examiner*—Vincent P. McGraw
*Attorney, Agent, or Firm*—Oblon, Spivak, McClelland, Maier & Neustadt, P.C.

[57] ABSTRACT

An electro-optical system is devised for scanning a color document into electrical signals for reproduction of the color document. The electro-optical system comprises a white light source for generating a beam of white light for illuminating the color document being scanned. A self-focus lens array consisting of at least a first row, a second row, and a third row of rod lenses is used to focus the reflected light from the color document onto a linear photosensor array. To separate the reflected light into RGB components, a first strip of red filter film is attached to one end of the first row of rod lenses; a second strip of green filter film is attached to one end of the second row of rod lenses; and a third strip of blue filter film is attached to one end of the third row of rod lenses. The light passing through the self-focus lens array causes the linear photosensor array to generate electrical signals representative of the amounts of the red, green, and blue components in the reflected light. The color filter films are low-cost and easy to assemble, allowing the manufacture cost for the electro-optical system to be significantly reduced.

3 Claims, 3 Drawing Sheets

ELECTRO-OPTICAL SYSTEM FOR SCANNING COLOR DOCUMENTS

BACKGROUND OF THE INVENTION

1. Field of the Invention

The present invention relates to electro-optical systems, and more particularly, to an electro-optical system for scanning a color image, usually printed on paper, into at least three electrical signals representative of the red, green, and blue (RGB) components of the color image.

2. Description of Prior Art

Reproduction of color documents is now more and more widely used in the business circle for correspondence and presentations. Machines for this purpose include color copy machines, color scanners, color fax machines, and so forth.

In such machines, an electro-optical system is provided to convert the color image on the document into electrical signals indicative of the color components of each point on the document. These signals are then used by color printing means to reproduce the original color document elsewhere. FIG. 1 and FIG. 2 each shows a conventional electro-optical system for this purpose.

Referring to FIG. 1, the conventional electro-optical system shown here is composed of: (1) a set of RGB light sources 110 including a red light source 111, a green light source 112, and a blue light source 113; (2) a self-focus lens array (SLA) 120 including a single row of rod lenses; and (3) a linear photosensor array 130 including a single row of photo-sensitive cells as photodiodes, phototransistors, or charge-coupled devices (CCD) each being aligned with one rod lens in the self-focus lens array 120. Each pair of a rod lens and a photo-sensitive cell is arranged corresponding to a scanned dot on the original document D and is used to convert the color of the scanned dot into a corresponding pixel (picture element) in the reproduced color image. The electro-optical system is customarily a fixed part of the machine.

In operation, the color document D is moved to pass the top of the self-focus lens array 120 so as to be scanned line by line. During the scan of a line, the RGB light sources 111, 112, and 113 are each turned on once in an alternate manner.

Referring also to FIG. 1B, when the red light source 111 is turned on, the reflection of the red light from the document D is focused by the self-focus lens array 120 onto a corresponding photo-sensitive cell in the linear photosensor array 130, thereby causing the photo-sensitive cell to generate a first electrical signal indicative of the amount of red component of the color of the corresponding dot on the document D. Similarly, when the green light source 112 is turned on, the reflection of the green light from the document D is focused by the self-focus lens array 120 onto the same photosensitive cell in the linear photosensor array 130, thereby causing that photo-sensitive cell to generate a second electrical signal indicative of the amount of green component of the color of the corresponding dot on the document D; and when the blue light source 113 is turned on, the reflection of the blue light from the document D is focused by the self-focus lens array 120 onto the same photo-sensitive cell in the linear photosensor array 130, thereby causing that photo-sensitive cell to generate a third electrical signal indicative of the amount of blue component of the color of the corresponding dot on the document D. A summing circuit (not shown) in the electro-optical system is then used to combine the sequentially generated RGB signals from the same photo-sensitive cell for subsequent color reproduction.

It is a drawback of the electro-optical system of FIGS. 1A–1B that the scan time is quite lengthy since each scan of a line on the document D requires the RGB light sources 111, 112, and 113 to be each turned on once in an alternate manner.

FIGS. 2A–2B show another conventional electro-optical system that can reduce the scan time to one-third of the scan time by the electro-optical system of FIGS. 1A–1B. This electro-optical system is composed of a white light source 210, a self-focus lens array 220 including three rows of rod lenses 221, 222, 223, and a linear photosensor array 230 including three rows of photo-sensitive cells 231, 232, 233. The particular aspect of this electro-optical system that distinguished it from the one shown in FIGS. 1A–1B is that the three rows of photo-sensitive cells in the array 230 are deposited with a color filtering layer 240 including a first layer of red filtering semiconductor material 241, a second layer of green filtering semiconductor material 242, and a third layer of blue filtering semiconductor material 243. The semiconductor material can be photoresist or oxide that has the recited light filtering quality.

During the scan of a line, the white source 210 produce a beam of white light to illuminate the document D. As more clearly depicted in FIG. 2B, the reflected light from the document D is subsequently focused by the self-focus lens array 220 onto the respective photo-sensitive cells on the array 230. The red filtering layer 241 on the first row of photo-sensitive cells 231 allows only the red component of the reflected light to pass therethrough to the first row of photo-sensitive cells 231, thereby causing the first row of photo-sensitive cells 231 to generate a first electrical signal indicative of the amount of the red component. Similarly, the green filtering layer 242 on the second row of photo-sensitive cells 232 allows only the green component of the reflected light to pass therethrough to the second row of photo-sensitive cells 232, thereby causing the second row of photo-sensitive cells 232 to generate a second electrical signal indicative of the amount of the green component; and the blue filtering layer 243 on the third row of photo-sensitive cells 233 allows only the blue component of the reflected light to pass through to the third row of photo-sensitive cells 233, thereby causing the third row of photo-sensitive cells 233 to generate a third electrical signal indicative of the amount of the blue component. A summing circuit (not shown) in the electro-optical system is then used to combine the RGB signals for subsequent color reproduction.

Although the electro-optical system of FIGS. 2A–2B has the benefit of saving the scan time to only one-third achieved by the electro-optical system of FIGS. 1A–1B, there is a drawback that the color filtering layer 240 on the linear photosensor array 230 is quite laborious and time-consuming to fabricate. As illustrated in FIG. 2B, in the process for fabricating the color filtering layer 240, at least three masks are required, respectively used to form the red filtering layer 241, the green filtering layer 242, and the blue filtering layer 243. The manufacture cost for the electro-optical system of FIGS. 2A–2B is therefore extremely high.

There exists therefore a need for a new electro-optical system which not only allows the scan time to be short, but also allows the manufacture cost to be significantly low.

SUMMARY OF THE INVENTION

It is therefore a primary objective of the present invention to provide an electro-optical system for scanning color images into electrical signals which can scan the document quickly with a short scan time.

It is another objective of the present invention to provide an electro-optical system for scanning color images into electrical signals which can be manufactured with low cost.

In accordance with the foregoing and other objectives of the present invention, a new and improved electro-optical system for scanning color images into electrical signals is provided. The electro-optical system comprises, as in conventional systems, a white light source for generating a beam of white light for illuminating the color object being scanned and a self-focus lens array consisting of at least a first row, a second row, and a third row of rod lenses. It is a characteristic part of the present invention that the electro-optical system comprises a first strip of red filter film attached to one end of the first row of rod lenses in the self-focus lens array; a second strip of green filter film attached to one end of the second row of rod lenses in the self-focus lens array, and a third strip of blue filter film attached to one end of the third row of rod lenses in the self-focus lens array. Further, the light passing through the self-focus lens array causes a linear photosensor array to generate at least three electrical signals representative of the amounts of the red, green, and blue components of the reflected light from the color object being scanned.

BRIEF DESCRIPTION OF DRAWINGS

The present invention can be more fully understood by reading the subsequent detailed description of the preferred embodiments thereof with references made to the accompanying drawings, wherein.

DETAILED DESCRIPTION OF PREFERRED EMBODIMENT

Figure 3A:
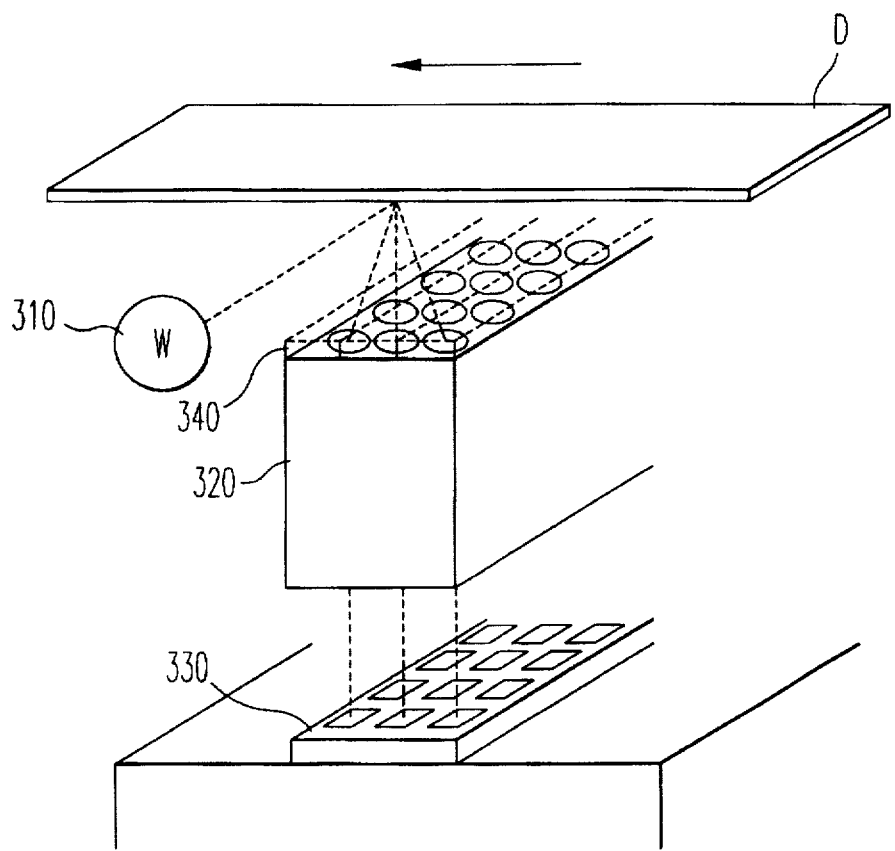
FIG. 3A is a schematic perspective diagram of an electro-optical system according to the present invention for scanning a color document.
Figure 3B:
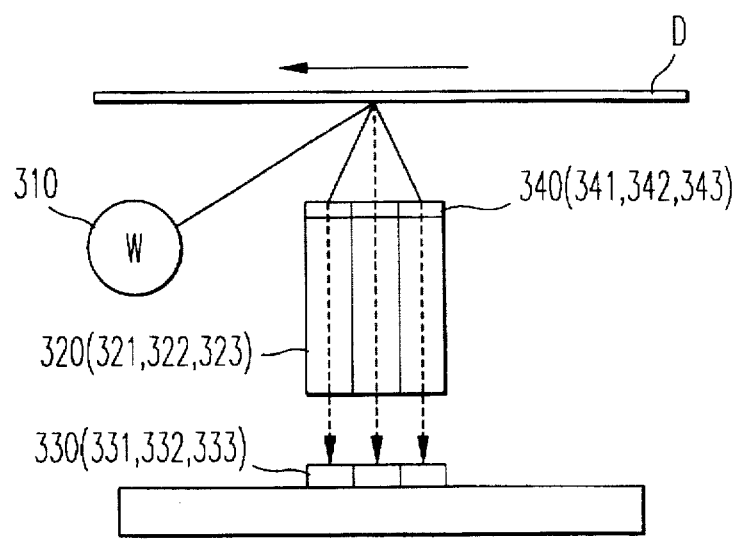
FIG. 3B is a schematic sectional diagram of the electro-optical system of FIG. 3A.

Referring to FIG. 3A–3B, there are shown an electro-optical system devised in accordance with the present invention, which is composed of a white light source 310, a self-focus lens array 320 including three rows of rod lenses 321, 322, 323, and a linear photosensor array 330 including also three rows of photo-sensitive cells 331, 332, 333 aligned respectively with the three rod lens rows 321, 322, 323 in the self-focus lens array 320.

Furthermore, it is an important aspect of the present invention that the light receiving end of the self-focus lens array 320 is adhered with a color filter film 340 including a film of red filter 341 on the first rod lens row 321, a film of green filter 342 on the second rod lens row 322, and a film of blue filter 343 on the third rod lens row 323. These filter films can be plastic pieces colored respective with red, green, and blue.

As illustrated in FIG. 3B, in operation, the white light source 310 generates a beam of white light to illuminate the document D. The reflected light from the document D is directed to the self-focus lens array 320. Prior to entering the self-focus lens array 320, the reflected light is color filtered respectively by the red filter film 341, the green filter film 342, and the blue filter film 343. As a consequence, the red component of the reflected light enters into the first rod lens row 321; the green component of the reflected light enters into the second rod lens row 322; and the blue component of the reflected light enters into the third rod lens row 323. The three color components of the reflected light are subsequently focused by the respective rod lenses onto the corresponding photo-sensitive cells in the linear photosensor array 330, causing the first row of photo-sensitive cells 331 to generate a first electrical signal indicative of the amount of the red component in the reflected light, the second row of photo-sensitive cells 332 to generate a second electrical signal indicative of the amount of the green component in the reflected light, and the third row of photo-sensitive cells 333 to generate a third electrical signal indicative of the amount of the blue component in the reflected light. A summing circuit (not shown) in the electro-optical system is then used to combine the RGB signals for subsequent color reproduction.

Figure 1A:
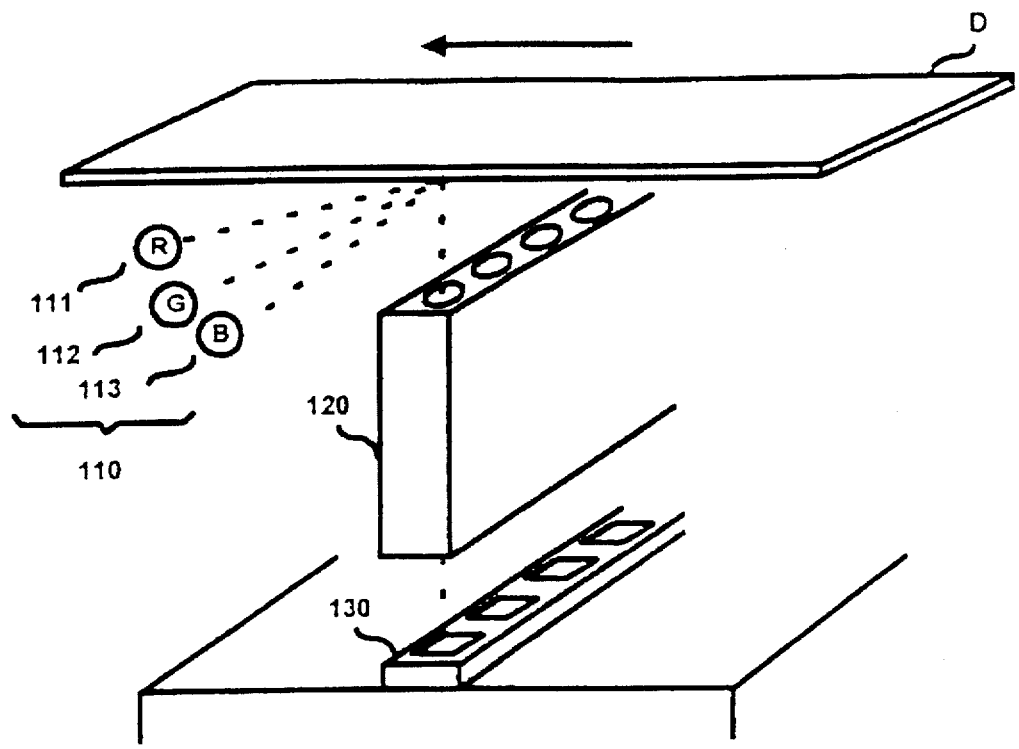
FIG. 1A is a schematic perspective diagram of a first conventional electro-optical system for scanning a color document.
Figure 1B:
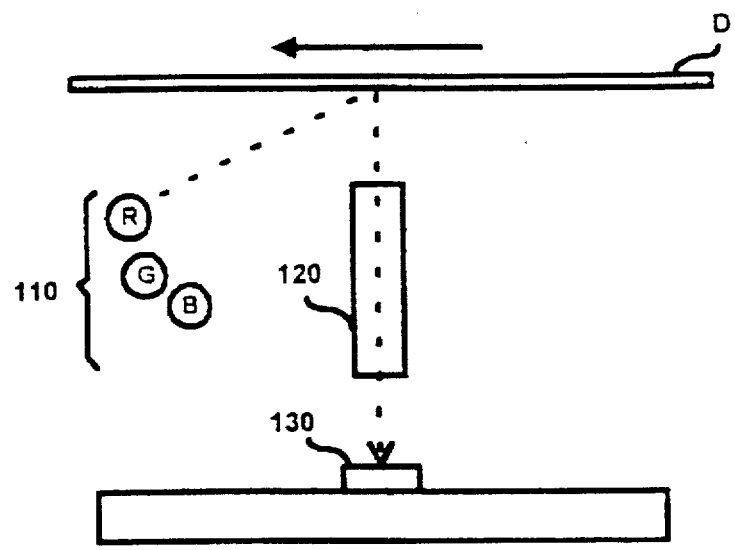
FIG. 1B is a schematic sectional diagram of the electro-optical system of FIG. 1A.
Figure 2A:
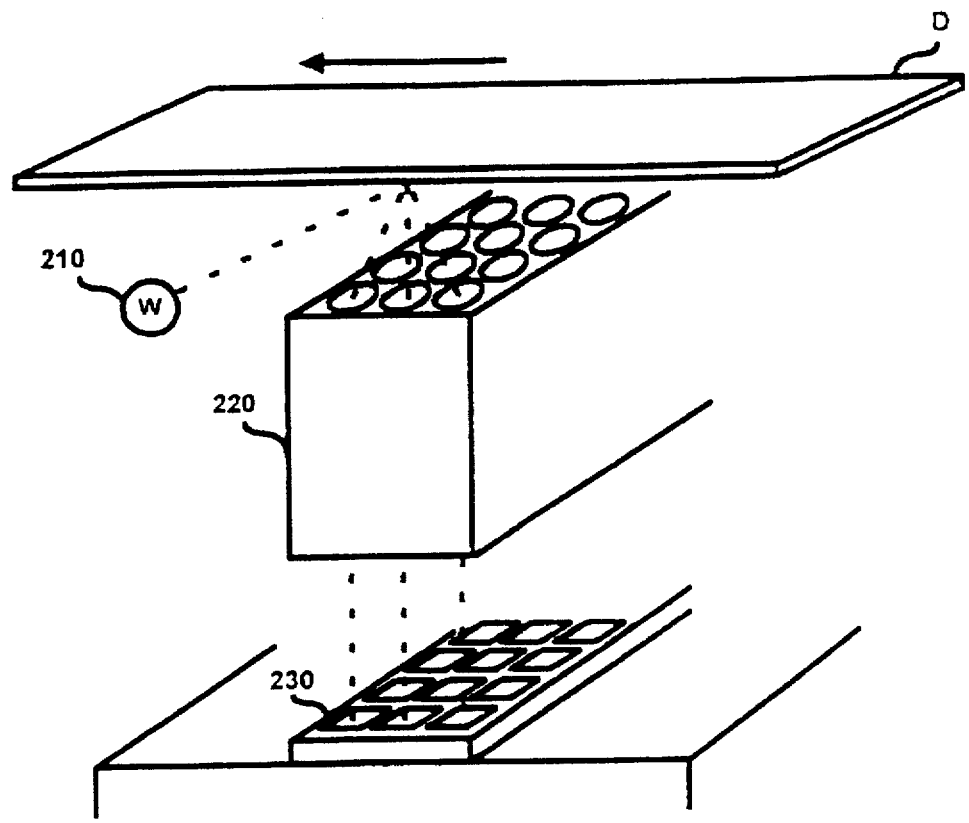
FIG. 2A is a schematic perspective diagram of a second conventional electro-optical system for scanning a color document.
Figure 2B:
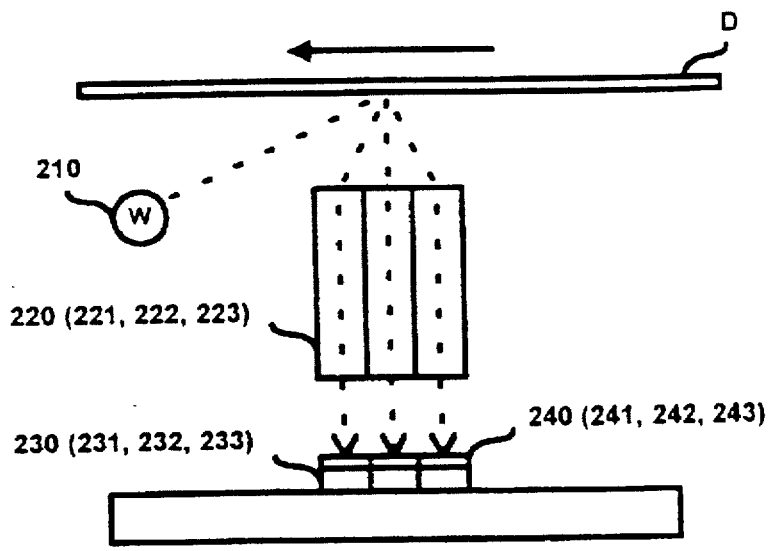
FIG. 2B is a schematic sectional diagram of the electro-optical system of FIG. 2A.

The red, green, and blue filter films 341, 342, 343 are low-cost and readily available color filtering means. They can be easily mounted on the light receiving end of the self-focus lens array by adhering with glue or any other conventional means capable of securing plastic pieces on a flat surface. The manufacture cost for the electro-optical system according to the present invention is therefore significantly reduced compared to the conventional one shown in FIGS. 2A–2B.

The present invention has been described hitherto with exemplary preferred embodiments. However, it is to be understood that the scope of the present invention need not be limited to the disclosed preferred embodiments. On the contrary, it is intended to cover various modifications and similar arrangements within the scope defined in the following appended claims. The scope of the claims should be accorded the broadest interpretation so as to encompass all such modifications and similar arrangements.

What is claimed is:

1. An electro-optical system for scanning a color object into at least three electrical signals indicative of an RGB set of color components of the color object, comprising:

(a) means for generating a beam of white light for illuminating the color object;

(b) a self-focus lens array consisting of at least a first row, a second row, and a third row of rod lenses, for receiving light reflected from the color object;

(c) a first film of red filter attached to one end of said first row of rod lenses in said self-focus lens array;

(d) a second film of green filter attached to one end of said second row of rod lenses in said self-focus lens array;

(e) a third film of blue filter attached to one end of said third row of rod lenses in said self-focus lens array; and (f) photosensor means, receiving light from said self-focus lens array, for generating at least three electrical signals representative of the red, green, and blue components of the reflected light from the color object.

2. An electro-optical system as claimed in claim 1, wherein said photosensor means is a linear photosensor array comprises at least:

(i) a first row of photo-sensitive cells, receiving light passing through said first row of rod lenses, for generating a first electrical signal indicative of the amount of the red component in the reflected light from the color object;

(ii) a second row of photo-sensitive cells, receiving light passing through said second row of rod lenses, for generating a second electrical signal indicative of the green component in the reflected light from the color object; and (iii) a third row of photo-sensitive cells, receiving light passing through said third row of rod lenses, for generating a third electrical signal indicative of the blue component in the reflected light from the color object.

3. An electro-optical system as claimed in claim 1, wherein said first film of red filter, said second film of green filter, and said third film of blue filter are attached to the light receiving end of said self-focus lens array.

* * * * *